United States Patent
Zhang et al.

(10) Patent No.: US 11,095,354 B2
(45) Date of Patent: Aug. 17, 2021

(54) METHOD AND APPARATUS FOR TRANSMITTING AND RECEIVING REFERENCE SIGNAL AND FOR SCHEDULING

(71) Applicant: Samsung Electronics Co., Ltd., Gyeonggi-do (KR)

(72) Inventors: Ranran Zhang, Beijing (CN); Xiaohui Yang, Beijing (CN); Zhichun Shen, Beijing (CN); Meifang Jing, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 174 days.

(21) Appl. No.: 15/528,479

(22) PCT Filed: Nov. 19, 2015

(86) PCT No.: PCT/KR2015/012451
§ 371 (c)(1),
(2) Date: May 19, 2017

(87) PCT Pub. No.: WO2016/080776
PCT Pub. Date: May 26, 2016

(65) Prior Publication Data
US 2017/0264355 A1    Sep. 14, 2017

(30) Foreign Application Priority Data

Nov. 19, 2014 (CN) .......................... 201410665558.1

(51) Int. Cl.
*H04J 11/00* (2006.01)
*H04B 7/06* (2006.01)
(Continued)

(52) U.S. Cl.
CPC .......... *H04B 7/0639* (2013.01); *H04J 11/003* (2013.01); *H04L 5/0048* (2013.01);
(Continued)

(58) Field of Classification Search
CPC ............... H04L 25/0224; H04L 5/0048; H04L 27/2613; H04L 5/0091; H04L 5/0053;
(Continued)

(56) References Cited

U.S. PATENT DOCUMENTS 7,840,319 B2 * 11/2010 Zhong .................... G06Q 10/08
                                                              455/446
7,945,658 B1 *  5/2011 Nucci .................... H04L 41/065
                                                              370/238
(Continued)

FOREIGN PATENT DOCUMENTS

CN      102754475 A    10/2012
EP       2993804 A1     3/2016
(Continued)

OTHER PUBLICATIONS

"3rd Generation Partnership Project; Technical Specification Group Radio Access Network; Evolved Universal Terrestrial Radio Access (E-UTRA); Multiplexing and Channel Coding (Release 9)," 3GPP TS 36.212, V9.2.0, Jun. 2010, 61 pages.
(Continued)

*Primary Examiner* — Un C Cho
*Assistant Examiner* — Kenan Cehic

(57) ABSTRACT

The present application provide a reference signal transmitting method, including: notifying a User Equipment (UE) of a grid index and a reference signal port index of the UE, wherein a coverage area of a base station is divided into grids, the grid index of the UE is an index of a grid where the UE is located; generating a reference signal based on the grid index; and transmitting the reference signal on corre-
(Continued)

sponding time-frequency resources based on the grid index and the reference signal port index. The present application further provides a corresponding reference signal transmitting apparatus, and a scheduling method and apparatus. According to the technical solution provided by the present application, it is possible to increase the number of ports that the system can support at the same time with low reference resource overhead, and to ensure that the interference of the reference signal is controllable and eliminable, thereby ensuring transmission reliability.

16 Claims, 6 Drawing Sheets

(51) Int. Cl.
| | |
|---|---|
| *H04L 5/00* | (2006.01) |
| *H04L 27/26* | (2006.01) |
| *H04W 72/04* | (2009.01) |
| *H04W 72/08* | (2009.01) |
| *H04B 7/0452* | (2017.01) |
| *H04W 84/04* | (2009.01) |

(52) U.S. Cl.
CPC ........ *H04L 5/0091* (2013.01); *H04L 27/2613* (2013.01); *H04W 72/042* (2013.01); *H04W 72/082* (2013.01); *H04B 7/0452* (2013.01); *H04B 7/0617* (2013.01); *H04L 5/0053* (2013.01); *H04W 72/044* (2013.01); *H04W 84/042* (2013.01)

(58) Field of Classification Search
CPC ... H04W 16/00; H04W 16/02; H04W 72/042; H04W 72/082; H04W 72/044; H04W 84/042; H04B 2201/00; H04B 2201/69; H04B 2201/7163; H04B 2201/71636; H04B 7/0639; H04B 7/0617; H04B 7/0452; H04J 11/003
See application file for complete search history.

(56) References Cited

U.S. PATENT DOCUMENTS

| 10,420,170 | B2* | 9/2019 | Garg | H04W 24/02 |
|---|---|---|---|---|
| 2005/0130616 | A1* | 6/2005 | Khayrallah | H04B 1/707 |
| | | | | 455/242.2 |
| 2007/0213046 | A1* | 9/2007 | Li | H04L 5/0016 |
| | | | | 455/425 |
| 2007/0298805 | A1* | 12/2007 | Basak | H04W 16/18 |
| | | | | 455/446 |
| 2009/0046793 | A1 | 2/2009 | Love et al. | |
| 2010/0197318 | A1* | 8/2010 | Petersen | H04L 67/22 |
| | | | | 455/456.1 |
| 2011/0014889 | A1* | 1/2011 | Lipka | H04B 1/1036 |
| | | | | 455/296 |
| 2011/0019776 | A1 | 1/2011 | Zhang et al. | |
| 2011/0199986 | A1* | 8/2011 | Fong | H04L 5/0035 |
| | | | | 370/329 |
| 2012/0046017 | A1* | 2/2012 | Jennings | G06Q 50/01 |
| | | | | 455/414.1 |
| 2013/0114444 | A1 | 5/2013 | Wu et al. | |
| 2013/0176978 | A1* | 7/2013 | Abe | H04W 72/04 |
| | | | | 370/329 |
| 2013/0265951 | A1 | 10/2013 | Ng et al. | |
| 2014/0146765 | A1 | 5/2014 | Ji et al. | |
| 2015/0003365 | A1 | 1/2015 | Seo | |
| 2015/0036628 | A1* | 2/2015 | Lou | H04W 72/0426 |
| | | | | 370/329 |
| 2016/0013447 | A1* | 1/2016 | Wehlus | H01L 51/5268 |
| | | | | 257/40 |
| 2016/0037294 | A1* | 2/2016 | Zhang | H04W 4/02 |
| | | | | 455/456.1 |
| 2016/0080058 | A1 | 3/2016 | Kang et al. | |
| 2016/0080908 | A1* | 3/2016 | Julian | H04L 41/142 |
| | | | | 455/457 |
| 2016/0172630 | A1* | 6/2016 | Reusch | G02B 5/0205 |
| | | | | 257/40 |
| 2017/0195934 | A1* | 7/2017 | Kang | H04W 36/30 |
| 2018/0205437 | A1* | 7/2018 | Kim | H04B 7/06 |
| 2018/0234818 | A1* | 8/2018 | Mu | H04L 51/32 |
| 2020/0015318 | A1* | 1/2020 | Garg | H04W 4/023 |

FOREIGN PATENT DOCUMENTS

| KR | 10-2013-0092467 A | 8/2013 |
|---|---|---|
| WO | 2014/178648 A1 | 11/2014 |

OTHER PUBLICATIONS

"3rd Generation Partnership Project; Technical Specification Group Radio Access Network; Study on 3D Channel Model for LTE (Release 12)," 3GPP TR 36.873, V.12.0.0, Sep. 2014, 42 pages.
Foreign Communication From a Related Counterpart Application, PCT Application No. PCT/KR2015/012451, International Search Report dated Mar. 4, 2016, 3 pages.
Foreign Communication From a Related Counterpart Application, PCT Application No. PCT/KR2015/012451, Written Opinion dated Mar. 4, 2016, 6 pages.
Foreign Communication from Related Counterpart Application; European Patent Application No. 15861697.9; Extended European Search Report and European Search Opinion dated Jan. 29, 2018; 10 pages.
Communication pursuant to Rule 164(1) EPC dated Oct. 13, 2017 in connection with European Patent Application No. 15 86 1697.
Office Action dated Jul. 3, 2019 in connection with Chinese Patent Application No. 201410665558.1, 11 pages.

* cited by examiner

[Fig. 1]
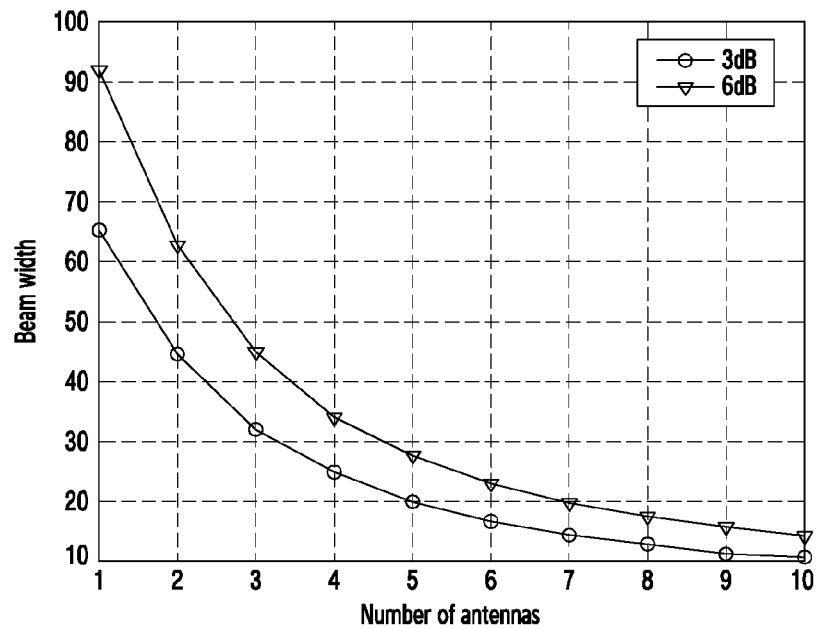
[Fig. 2]
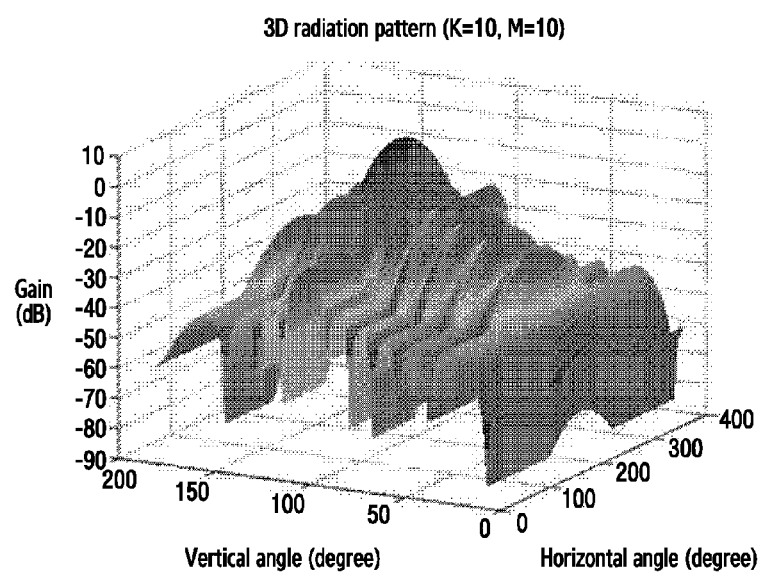

[Fig. 3]
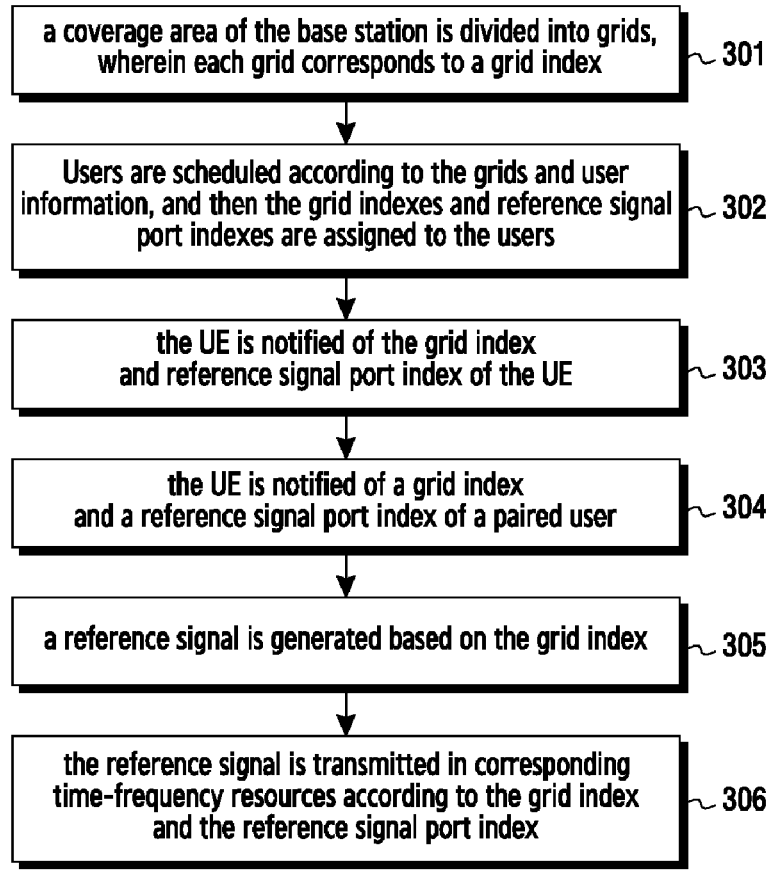
[Fig. 4]
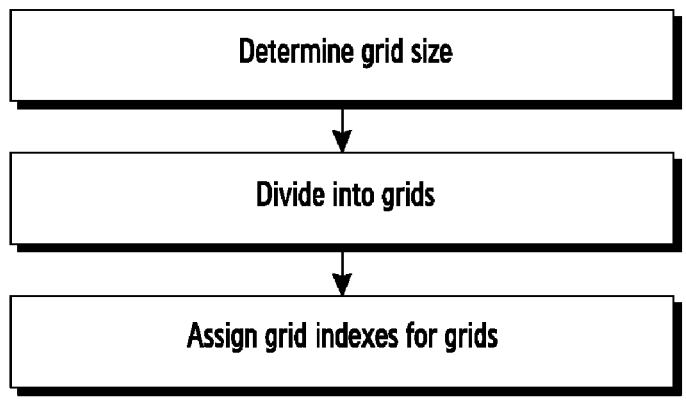

[Fig. 5]
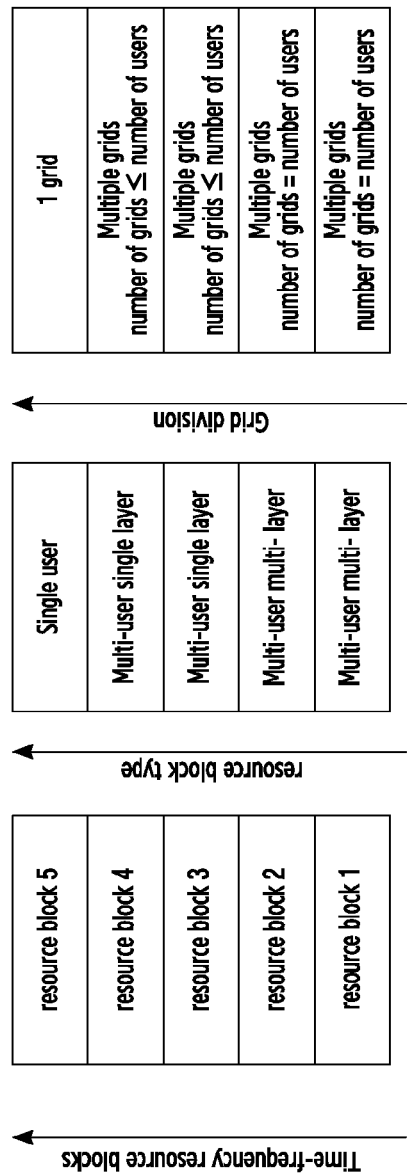

[Fig. 6]
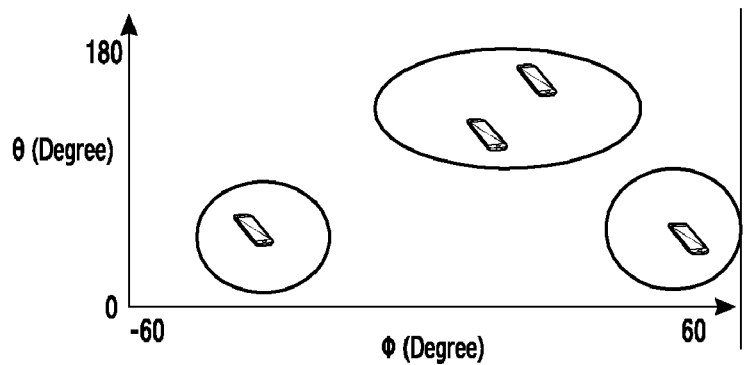
[Fig. 7]
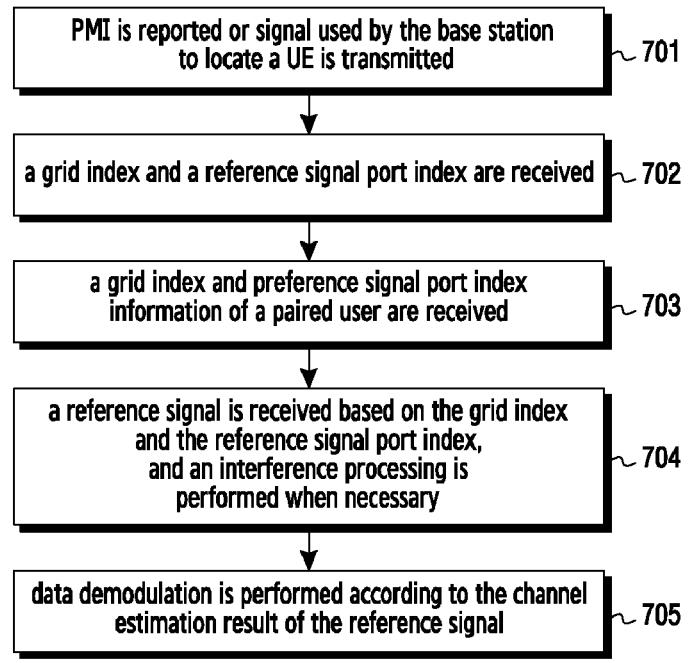

[Fig. 8]
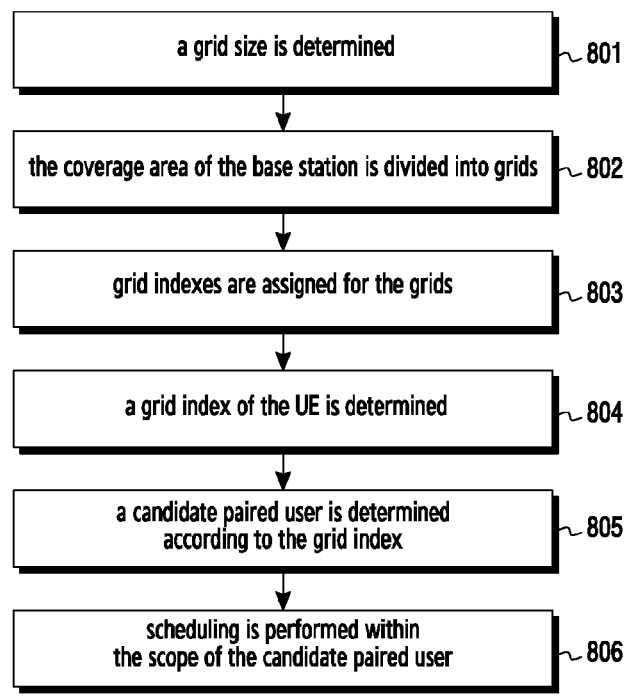
[Fig. 9]
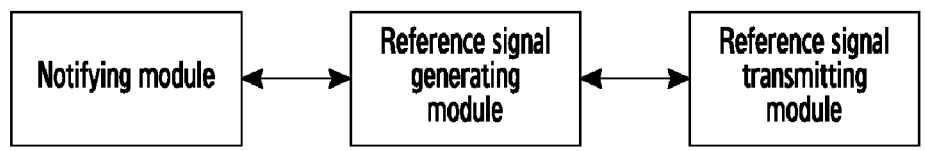

[Fig. 10]
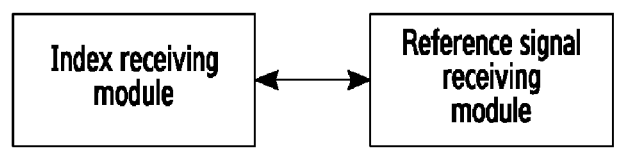
[Fig. 11]

METHOD AND APPARATUS FOR TRANSMITTING AND RECEIVING REFERENCE SIGNAL AND FOR SCHEDULING

CROSS-REFERENCE TO RELATED APPLICATIONS AND CLAIM OF PRIORITY

The present application claims priority under 35 U.S.C. § 365 to International Patent Application No. PCT/KR2015/012451, which was filed on Nov. 19, 2015, and claims priority to Chinese Patent Application 201410665558.1, which was filed on Nov. 19, 2014, each of which are incorporated herein by reference into the present disclosure as if fully set forth herein.

TECHNICAL FIELD

The present invention relates to wireless communication techniques, and more particularly, to reference signal transmitting and receiving methods and apparatuses and a scheduling method and apparatus.

BACKGROUND ART

In mobile communication systems, the wireless fading channel has a time-variant feature. In order to effectively detect a transmission signal, channel information is required to be obtained to realize correlation detection. In order to obtain the channel information, a transmission node transmits a pre-negotiated known signal or sequence. A receiving node obtains the channel information through detecting the known signal or sequence. The known signal or sequence is referred to as a preamble signal or reference signal.

LTE/LTE-A system is a typical correlation detection system. According to functions of the reference signal, there are 7 kinds of reference signals, which are present as:

downlink Cell-specific Reference Signal (CRS), used for data demodulation for broadcast channel and downlink control channel, channel status information measurement for transmission modes 1~8 of the downlink shared channel and data demodulation for transmission modes 1~6 of the downlink shared channel;

Multimedia Broadcast Multicast Service Single Frequency Network Reference Signal (MBSFN RS), used for data demodulation for multicast channels;

downlink User Equipment specific Reference Signal (UERS), used for data demodulation for transmission modes 7-10 of the downlink shared channel;

Channel State Information Reference Signal (CSI-RS), used for channel state information measurement for transmission modes 9~10 of the downlink shared channel;

Positioning Reference Signal (PRS), used for terminal positioning function;

uplink Demodulation Reference Signal (DMRS), used for data demodulation for uplink shared channel and uplink control channel; and uplink Sounding Reference Signal (SRS), used for measurement of uplink channel state information, and downlink channel information may be obtained at the same time via channel reciprocity.

In the LTE-A system, the UERS signal is mainly used for channel estimation and synchronization of Physical Downlink Shared Channel (PDSCH), so as to realize data demodulation. Scrambling sequences of the UERS channel are initially configured according to a cell ID of a serving cell (or an adjacent cell ID).

In a current LTE-A system, the scrambling sequence of the downlink UERS may be transmitted via multiple ports of the network side. At present, there are 8 ports may be used for transmitting the UERS reference signal sequence, i.e., port 7, port 8, . . . , port 14. The generation method of the scrambling sequence of the UERS may be:

$$r(m) = \frac{1}{\sqrt{2}}(1 - 2 \cdot c(2m)) + j\frac{1}{\sqrt{2}}(1 - 2 \cdot c(2m+1)),$$

$$m = \begin{cases} 0, 1, \ldots, 12N_{RB}^{max,DL} - 1 & \text{normal CP} \\ 0, 1, \ldots, 16N_{RB}^{max,DL} - 1 & \text{extended CP} \end{cases}$$

wherein the initial sequence is:

$$c_{init} = (\lfloor n_s/2 \rfloor + 1) \cdot (2n_{ID}^{(nSCID)} + 1) \cdot 2^{16} + n_{SCID};$$

wherein $n_{ID}^{(i)} = n_{ID}^{cell}$ or $n_{ID}^{(i)} = n_{ID}^{DMRS,i}$, $N_{ID}^{cell}$ denoted the serving cell ID, $n_{ID}^{DMRS,i}$ is a parameter configured by higher layer and denotes a fake adjacent cell ID, $N_{RB}^{max,DL}$ denotes maximum number of downlink resource elements in system bandwidth, and ns denotes a slot index.

During Multi-User Multiple-Input Multiple-Output (MU-MIMO) transmission, the UE has two kinds of UERS port configurations and two kinds of scrambling sequence configurations. Therefore, at most 4 layers of UERS based multiplexing transmission are supported, in particular:

1) UERS configuration 1: port 7, $n_{SCID}=0$;
2) UERS configuration 2: port 8, $n_{SCID}=0$;
3) UERS configuration 3: port 7, $n_{SCID}=1$;
4) UERS configuration 4: port 8, $n_{SCID}=1$.

During the scheduling of Physical Downlink Control Channel (PDCCH), the base station uses 3 bits in corresponding Downlink Control Information (DCI) to indicate in association the current number of transmission layers, UERS port and the used $n_{SCID}$, as shown in Table 1.

TABLE 1

| Single code word: code word 0 is effective, code word 1 is ineffective | | Double code words: code word 0 is effective, code word 1 is effective | |
|---|---|---|---|
| Signalling value | Signalling message | Signalling value | Signalling message |
| 0 | 1 layer, port 7, $n_{SCID} = 0$ | 0 | 2 layers, port 7-8, $n_{SCID} = 0$ |
| 1 | 1 layer, port 7, $n_{SCID} = 1$ | 1 | 2 layers, port 7-8, $n_{SCID} = 1$ |
| 2 | 1 layer, port 8, $n_{SCID} = 0$ | 2 | 3 layers, port 7-9 |
| 3 | 1 layer, port 8, $n_{SCID} = 1$ | 3 | 4 layers, port 7-10 |
| 4 | 2 layers, port 7-8 | 4 | 5 layers, port 7-11 |
| 5 | 3 layers, port 7-9 | 5 | 6 layers, port 7-12 |
| 6 | 4 layers, port 7-10 | 6 | 7 layers, port 7-13 |
| 7 | reserved | 7 | 8 layers, port 7-14 |

Wherein ports 7 and 8 adopt the same time-frequency resources and orthogonality is realized through Code Division Multiplexing (CDM) to avoid interference between each other.

When two paired users use the same $n_{SCID}$, the DMRS of them do not interfere with each other; when they use different $n_{SCID}$, there may be some interferences.

During CoMP transmission, UERS interference is avoided through configuring $n_{ID}^{(i)} = n_{ID}^{DMRS,i}$ by the higher layer.

According to the above description, the UERS of the current LTE-A is designed based on interference avoidance and interference indulge manner. That is, on one hand, orthogonal transmission of the UERS of each port is ensured as much as possible. On the other hand, for the interference between paired users due to different $n_{SCD}$ on ports 7 and 8, the interference is not controlled and relevant interference information of the interfered user is not provided.

If Active Antenna System (AAS) is adopted, the base station may have dozens or hundreds of antennas. The system may support downlink transmissions of dozens or even hundreds of users in the same time-frequency resources. In this situation, the existing number of UERS ports is obviously not enough for supporting the downlink transmissions of so many users. On the other hand, if orthogonal resources (time-domain, frequency-domain, and code-domain) are adopted to transmit the UERS of different ports as much as possible based on the existing interference avoidance scheme, the overhead of the reference resources will be rather large.

DISCLOSURE OF INVENTION

Solution to Problem

The present application provides reference signal transmitting and receiving methods and apparatuses, and a scheduling method and apparatus, so as to increase the number of ports supported by the system at the same time with low reference resource overhead, and ensure that the interference of the reference signal is controllable and eliminable, thereby ensuring the reliability of the transmission.

The present application provides a reference signal transmitting method, including:

notifying a UE of a grid index and a reference signal port index of the UE, wherein a coverage area of a base station is divided into grids, the grid index of the UE is an index of a grid where the UE is located;

generating a reference signal based on the grid index; and transmitting the reference signal on corresponding time-frequency resources based on the grid index and the reference signal port index.

In one embodiment, before notifying the UE of the grid index and the reference signal port index of the UE, the method further includes:

dividing the coverage area of the base station into the grids, wherein each grid respectively corresponds to one grid index;

scheduling the UE according to the grids and user information, assigning the grid index and the reference signal port index to the UE; wherein UEs in the same grid are assigned with the same grid index and different reference signal port indexes, users in different grids are assigned with different grid indexes.

In one embodiment, before notifying the UE of the grid index and the reference signal port index of the UE, the method further includes:

receiving a Pre-encoding Matrix Indicator (PMI) or a signal used by the base station for positioning the UE reported by the UE.

In one embodiment, the dividing the coverage area of the base station into grids and each grid respectively corresponds to one grid index includes:

determining a grid size;

dividing the coverage area of the base station into the grids of the grid size; and assigning the grid indexes for the grids.

In one embodiment, the grid size is determined according to at least one of: mobility speed, interference level, complexity, maximum number of users supported, and network offload.

In one embodiment, when notifying the UE of the grid index and the reference signal port index of the UE, the method further includes:

notifying the UE of a grid index and a reference signal port index of at least one paired user of the UE.

In one embodiment, the method further includes:

selecting at least one paired user according to an interference situation between the UE and other users.

In one embodiment, the generating the reference signal based on the grid index includes: deriving an initial sequence of the reference signal using the grid index, or generating the reference signal corresponding to the grid index according to a mapping relationship between the grid index and a reference signal sequence.

In one embodiment, the transmitting the reference signal in the corresponding time-frequency resources based on the grid index and the reference signal port index includes: transmitting reference signal sequences corresponding to different grid indexes using the same resources, and transmitting reference signal sequences corresponding to the same grid index using the same or different resources.

A reference signal transmitting apparatus, including: a notifying module, a reference signal generating module and a reference signal transmitting module; wherein the notifying module is adapted to notify a UE of a grid index and a reference signal port index of the UE; wherein a coverage area of a base station is divided into grids the grid index of the UE is an index of a grid where the UE is located;

the reference signal generating module is adapted to generate a reference signal based on the grid index; and the reference signal transmitting module is adapted to transmit the reference signal on corresponding time-frequency resources based on the grid index and the reference signal port index.

A reference signal receiving method, including:

receiving a grid index and a reference signal port index of a UE, wherein a coverage area of a base station is divided into grids, the grid index of the UE is an index of a grid where the UE is located; and receiving a reference signal based on the grid index and the reference signal port index.

In one embodiment, when receiving the grid index and the reference signal port index, the method further includes:

receiving a grid index and a reference signal port index of at least one paired user.

In one embodiment, after receiving the reference signal, the method further includes:

according to the grid index of the UE and the grid index of the paired user, and a relationship between grid index and grid space position, determining whether interference between the UE and the paired user requires interference processing;

if the interference processing is required, performing energy estimation to a reference signal of the paired user based on reference signal information of the paired user, if a result of the energy estimation indicates that the interference processing is required, performing interference elimination based on the reference signal information of the paired user during channel estimation for the reference signal of the UE.

In one embodiment, the determining whether interference between the UE and the paired user requires interference processing according to the grid index of the UE and the grid index of the paired user and the relationship between grid index and grid space position includes:

determining a space position of the UE according to the grid index of the UE and the relationship between the grid index and the grid space position, and determining a space position of the paired user according to the grid index of the paired user and the relationship between the grid index and the grid space position;

determining a distance between the UE and the paired user according to the space positions of the UE and the paired user; if the distance is smaller than a predefined distance, the interference processing is required; otherwise, the interference processing is not required.

Preferably, the performing the energy estimation to the reference signal of the paired user based on the reference signal information of the paired user includes:

obtaining a reference signal sequence transmitted by the paired user based on the grid index of the paired user according to a reference signal sequence generating method, determining a space channel direction of the paired user according to the relationship between the grid index and the grid space position, determining a pre-encoding vector of the paired user, retrieving an interference signal based on a channel estimation result without considering interference elimination, and calculating energy of the interference signal.

A reference signal receiving apparatus, including: an index receiving module and a reference signal receiving module; wherein the index receiving module is adapted to receive a grid index and a reference signal port index of a UE, wherein a coverage area of a base station is divided into grids, the grid index of the UE is an index of a grid where the UE is located; and the reference signal receiving module is adapted to receive a reference signal based on the grid index and the reference signal port index.

A scheduling method, including:

determining a grid index of a UE, wherein a coverage area of a base station is divided into grids, the grid index of the UE is an index of a grid where the UE is located;

determining a candidate paired user based on the grid index; and scheduling the user within a scope of the candidate paired user.

In one embodiment, before determining the grid index of the UE, the method further includes:

determining a grid size;

dividing the coverage area of the base station into the grids of the defined grid size; and assigning grid indexes for the grids.

Preferably, the grid size is determined according to at least one of: mobility speed, interference level, complexity, maximum number of users supported, and network offload.

In one embodiment, before determining the grid index of the UE, the method further includes:

receiving a Pre-encoding Matrix Indicator (PMI) or a signal used by the base station for positioning the UE, which is reported by the UE.

In one embodiment, the selecting the candidate paired user according to the grid index includes: selecting a user with a space position farther than a predefined threshold as the paired user according to the grid index of the user, and the relationship between the grid index and the grid space position.

A scheduling apparatus, including: an index determining module, a pairing module and a scheduling module; wherein the index determining module is adapted to determine a grid index of a UE, wherein a coverage area of a base station is divided into grids, the grid index of the UE is an index of a grid where the UE is located;

the pairing module is adapted to determine a candidate paired user based on the grid index; and the scheduling module is adapted to schedule the UE within a scope of the candidate paired user.

It can be seen from the above technical solution that, in the reference signal transmitting and receiving methods and apparatuses provided by the present application, the conventional technique is improved through a manner based on interference and interference elimination. On one hand, the number of ports supported by the system at the same time may be increased with low reference resource overhead. On the other hand, it is ensured that the interference of the reference signal is controllable and eliminable, so as to ensure the reliability of the transmission.

If the technical solution of the present application is applied to transmission and receiving of downlink demodulation reference signal, the maximum number of paired users supported by the downlink demodulation reference signal may be increased. For the LTE-A system, the maximum number of MU users supported may increase from 4 to 4 times of the number of grids. In addition, the technical solution of the present application may ensure the reliability of channel estimation for downlink demodulation reference signal, make the demodulation reference signal controllable and eliminable, and decrease the complexity of the scheduling algorithm.

BRIEF DESCRIPTION OF DRAWINGS

FIG. 1 is a schematic diagram illustrating change of vertical dimension beam width with the number of antennas when $1/X=-3$ dB and $1/X=-6$ dB;

FIG. 2 shows an antenna radiation pattern with 10 vertical dimension antennas and 1 horizontal dimension antenna;

FIG. 3 is a schematic diagram illustrating a reference signal transmitting method according to an embodiment of the present application;

FIG. 4 is a schematic diagram illustrating a grid division method with fixed size according to an embodiment of the present application;

FIG. 5 is a schematic diagram illustrating a time-variant and frequency-variant grid division method according to an embodiment of the present application;

FIG. 6 is a schematic diagram illustrating an non-uniform grid division method according to an embodiment of the present application;

FIG. 7 is a schematic diagram illustrating a reference signal receiving method according to an embodiment of the present application;

FIG. 8 is a schematic diagram illustrating a scheduling method according to an embodiment of the present application;

FIG. 9 is a schematic diagram illustrating a structure of a reference signal transmitting apparatus according to an embodiment of the present application;

FIG. 10 is a schematic diagram illustrating a structure of a reference signal receiving apparatus according to an embodiment of the present application; and FIG. 11 is a schematic diagram illustrating a structure of a scheduling apparatus according to an embodiment of the present application.

BEST MODE FOR CARRYING OUT THE INVENTION

The present invention will be described in further detail hereinafter with reference to accompanying drawings and embodiments to make the objective, technical solution and merits therein clearer.

Hereinafter, the interference space of MU-MIMO is analyzed first.

According to the MIMO theory, under a highly correlative channel condition, with the increase of the number of antennas, the width of the beam after performing beamforming to the antenna becomes narrower.

In particular, a wave beam may be formed in a three dimensional space after performing horizontal and/or vertical beamforming to a two dimensional antenna array. Hereinafter, a space isolation degree formed under a corresponding antenna configuration is determined through analyzing an antenna radiation pattern containing an antenna array gain after beamforming.

Suppose that a vertical antenna radiation pattern of each antenna element is $A_{E,V}(\theta'')$, wherein $\theta''$ denotes a vertical angle in a local coordinate system of the antenna array.

Take the 3GPP TS 36.873 as an example, the vertical radiation pattern is:

$$A_{E,V}(\theta'') = -\min\left[12\left(\frac{\theta''-90°}{\theta_{3dB}}\right)^2, SLA_V\right],$$

$$\theta_{3dB} = 65°, SLA_V = 30$$

Suppose that a horizontal antenna radiation pattern of each antenna element is $A_{E,H}(\varphi'')$: wherein $\varphi''$ denotes a horizontal angle in the local coordinate system of the antenna array.

Take the 3GPP TR 36.873 as an example, the horizontal radiation pattern is:

$$A_{E,H}(\varphi'') = -\min\left[12\left(\frac{\varphi''}{\varphi_{3dB}}\right)^2, A_m\right],$$

$$\varphi_{3dB} = 65°, A_m = 30$$

The radiation pattern of the antenna element in the 3D space is $A''(\theta'',\varphi'')$, take 3GPP TR 36.873 as an example, the radiation pattern in the 3D space is $$A''(\theta'',\varphi'') = -\min\{-[A_{E,V}(\theta'')+A_{E,H}(\varphi'')], A_m\}.$$

Suppose that the horizontal dimension of the 2D antenna array includes N antenna elements, the vertical dimension includes M antenna elements, the horizontal dimension and the vertical dimension are respectively formed adopting to the beamforming vector $W_H$ and $W_V$, suppose that the channel matrix is H, then the antenna radiation pattern after the beamforming is:

$$A''(\theta'',\varphi'')\|H \cdot (kron(W_H,W_V))\|;$$

wherein kron denotes matrix direct product calculation, $\|A\|$ denotes norm of vector A.

For facilitating the analysis, the array response in the Line Of Sight (LOS) direction is used to replace the channel matrix H. Thus, the horizontal array response may be expressed by:

$$H_H = \frac{1}{\sqrt{N}} \exp\left\{j\frac{2\pi}{\lambda} \cdot 0 \cdot d_H \cos\varphi \ldots j\frac{2\pi}{\lambda} \cdot (N-1) \cdot d_H \cos\varphi\right\}$$

The vertical array response may be expressed by:

$$H_V = \frac{1}{\sqrt{M}} \exp\left\{j\frac{2\pi}{\lambda} \cdot 0 \cdot d_V \cos\theta \ldots j\frac{2\pi}{\lambda} \cdot (N-1) \cdot d_V \cos\theta\right\}$$

The antenna radiation pattern after the beamforming may be approximately expressed by:

$$A_{total}(\theta'',\varphi'') = A''(\theta'',\varphi'')\|W_H^H \cdot H_H\| \cdot \|W_V^H \cdot H_V\|$$

Suppose that the beamforming vector $W_H$ and $W_V$ are DFT beamforming vector pointed to $(\theta_T, \varphi_T)$ direction of the user, the horizontal array gain is:

$$\|W_H^H \cdot H_H\| = \frac{1}{N}\left(\left(\sum_{n=1}^{N} \cos\left(\frac{2\pi}{\lambda} \cdot (n-1) \cdot d_H \cos(\varphi-\varphi_T)\right)\right)^2 + \left(\sum_{n=1}^{N} \sin\left(\frac{2\pi}{\lambda} \cdot (n-1) \cdot d_H \cos(\varphi-\varphi_T)\right)\right)^2\right)$$

Similarly, it may be obtained that the vertical array gain is:

$$\|W_V^H \cdot H_V\| = \frac{1}{M}\left(\left(\sum_{m=1}^{M} \cos\left(\frac{2\pi}{\lambda} \cdot (m-1) \cdot d_V \cos(\theta-\theta_T)\right)\right)^2 + \left(\sum_{m=1}^{M} \sin\left(\frac{2\pi}{\lambda} \cdot (m-1) \cdot d_V \cos(\theta-\theta_T)\right)\right)^2\right)$$

When $A_{total}(\theta'',\varphi'') = 1/X \cdot A_{total}(\theta_T,\varphi_T)$, $|\theta''-\theta_T| = \theta_x$ $|\varphi''-\varphi_T| = \varphi_x$ $(\theta_x, \varphi_x)$ may be used for denoting an angle scope when interference of a target user to other users is decreased to 1/X.

Therefore, the whole serving cell may be divided into $(M_x, N_x)$ grids of size $(\theta_x, \varphi_x)$, wherein $$M_x = \text{ceil}\left(\frac{180}{\theta_x}\right),$$

$$N_x = \text{ceil}\left(\frac{\Phi}{\varphi_x}\right);$$

wherein $\Phi$ denotes a horizontal coverage angle scope of the base station.

For users in the same grid, it may be regarded that the space isolation degree is relatively low. For users in different grids, it may be regarded that the space isolation degree is relatively high. If two grids are rather far from each other, it may be regarded that users in these two grids do not interfere with each other.

Take the vertical antenna gain of 3GPP TR 36.873 as an example, FIG. 1 shows changes of vertical beam width along with the number of antennas when 1/X=−3 dB and 1/x=−6 dB. It can be seen from FIG. 1 that, when the number of antennas is increased from 1 to 10, the 3 dB beam width is decreased from 65 degree to 10 degree, and the 6 dB beam width is decreased from 90 degree to 15 degree.

FIG. 2 shows an antenna radiation pattern with 10 vertical antennas and 1 horizontal antenna. It can be seen that, the antenna radiation concentrates in a relatively small angle (approximately 10 degree) in the vertical dimension, and is distributed in a relatively large area (approximately 65 degree) in the horizontal dimension.

Through the above analysis, it can be seen that, with the increase of the number of antennas, the beam width becomes narrower and the bean gain is increased, the beam may point to users accurately and avoid interference to other users at the same time.

Based on the above-mentioned interference space analysis, the space may be divided into grids. Interference between users in different grids is relatively low but interference between users in the same grids is relatively high. In the design of the reference signal, the present application does not adopt the scheme of the LTE-A system any more, i.e., the scheme in which the same scrambling sequence are adopted for the same cell and the reference signal resources are orthogonal. Instead, a new reference signal transmission method is proposed, as shown in FIG. 3, the method includes the following:

At block 301, a coverage area of the base station is divided into grids, wherein each grid corresponds to a grid index.

In particular, the division of the space may be implemented according to the above-mentioned analysis method. At the same time, the value of 1/X may be configured by considering mobility speed, interference level, complexity, maximum number of users that can be supported, network load and other factors, so as to obtain a reasonable grid size.

After the grid division, the grids are assigned with the grid indexes according to a certain rule. For example, the grid are assigned with the grid indexes according to a space grid sequence (i.e., sequence of the grids in the space), or according to a scrambling sequence of the space grids.

FIG. 4 is a schematic diagram illustrating a grid division method with fixed size according to an embodiment of the present application. The method includes the following:

First, the grid size is determined. It is possible to determine a minimum unit of horizontal and vertical grid according to an interference level threshold such as 1/X=−3 dB using $A_{total}(\theta'',\varphi'')=1/X \cdot A_{total}(\theta'', \varphi_T)$.

Then, grid division is performed. According to the determined minimum units of the grid, the coverage area of the base station is divided into several grids. For example, the whole serving cell may be divided into $(M_x, N_x)$ grids with size $(\theta_x, \varphi_x)$, wherein $|\theta''=\theta_T|=\theta_x$, $|\varphi''-\varphi_T|=\varphi_x$.

Finally, grid indexes are assigned for the grids. In one embodiment, the grids may be indexed according to an interference sequence relationship between the grids. The corresponding indexes are taken as the grid indexes, e.g., the interference between group 0 and group 1 is larger than that between group 0 and group 2, and so on.

FIG. 5 is a schematic diagram showing a time-variant and frequency-variant grid division method according to an embodiment of the present application. In this method, the division is performed according to the number of users and data layers multiplexed on the time-frequency resources. As shown in FIG. 5, with regard to different time-frequency positions that are occupied, the resources in the system bandwidth may be divided into different time-frequency resource blocks. The time-frequency resource blocks in the system bandwidth are classified into different types according to different scheduling situations of the UE, e.g., time-frequency resource block supporting single user transmission, time-frequency resource block supporting multi-user single layer transmission, and time-frequency resource block supporting multi-user multi-layer transmission. Different grid divisions are performed on different types of resource blocks.

For the time-frequency resource blocks supporting single user transmission, since interference between users or sharing of reference signal resources does not need to be considered, it is required to generate merely one grid. Certainly, it is also possible to generate multiple grids and the user uses merely one of the grids.

For the time-frequency resource blocks supporting multi-user single layer transmission, since the interference between users or the sharing of the reference signal resources needs to be considered, it is required to generate multiple grids; considering that different users may use different ports of the same grid to avoid interference, the total number of grids may be smaller than or equal to the number of users.

For the time-frequency resource blocks supporting multi-user multi-layer transmission, since the interference between users or the sharing of the reference signal resources needs to be considered, it is required to generate multiple grids, the total number of grids equals to the number of users.

FIG. 6 is a schematic diagram illustrating a non-uniform grid division method according to an embodiment of the present application. The grids generated in this method are not uniform.

The grid mentioned in the present application may be regarded as a kind of resource grid.

Further, the grid division may be dynamic, e.g. according to current user situations in the system, such that more of users are located in central grids.

At block 302, users are scheduled according to the grids and user information, and then the grid indexes and reference signal port indexes are assigned to the users.

The user information may include a Pre-encoding Matrix Index (PMI), Channel Quality Information (CQI), Rank Indication (RI) or user position information reported by the users, or user position information obtained via system positioning. The PMI information may include a vertical dimension PMI and a horizontal dimension PMI. In a TDD system, the user information may also be space channel information obtained via uplink channel estimation utilizing channel reciprocity of uplink and downlink channels. In an FDD system, the user information may be space channel information obtained via uplink channel estimation utilizing uplink and downlink multipath channel dispersion and symmetry of reflection path.

A horizontal angle and a vertical angle between the grid and the user may be determined according to the user position information. In case that the division is fixed, the grid where the user is located may be determined directly.

The horizontal angle and the vertical angle between the grid and the user may be determined according to the PMI and the space channel information. In case that the division is fixed, the grid where the user is located may be determined directly.

The horizontal angle and the vertical angle between the grid and the user may be determined according to the user position information. According to a horizontal angle and a vertical angle between different users, interference level between different users may be estimated. If the interference level is higher than a predefined threshold, the users are in the same grid. If the interference level is not higher than the predefined threshold, the users are not located in the same grid. As such, it is determined whether users are located in the same grid in case that the division is performed dynamically.

The interference level between different users may be estimated according to the PMI or the space channel information and the CQI, RI information. If the interference level is higher than the predefined threshold, the users are in the same grid. If the interference level is not higher than the predefined threshold, the users are not in the same grid. As such, it is possible to determine whether users are located in the same grid in case that the division is performed dynamically.

Based on the above determination result, grid indexes and reference signal port indexes are assigned to the users. For example, users in the same grid are assigned with the same grid index and different reference signal port indexes. Users in different grids are assigned with different grid indexes.

At block 303, the UE is notified of the grid index and reference signal port index of the UE.

In particular, the grid index and the reference signal port index may be transmitted via higher layer signaling, or the grid index may be transmitted via downlink control signaling.

At block 304, the UE is notified of a grid index and a reference signal port index of a paired user.

The paired user refers to a user which adopts the same time-frequency resources for MU-MIMO transmission as the UE.

Since the base station knows distribution of the users in the grids, the base station knows approximate interference situation of each paired user accordingly. Therefore, this block is optional. In this block, the base station may select a paired user having a high interference level and notify the UE of the grid index and the corresponding reference signal port index, or not notify, or notify the UE of the grid indexes and reference signal ports numbers of multiple paired users. In particular, the notification may be realized via higher layer signaling or via downlink control signaling.

The information in the above block 303 and the information in the above optional block 304 may be transmitted to the UE via the same signaling.

At block 305, a reference signal is generated based on the grid index.

In particular, when generating the reference signal (i.e., reference signal sequence) according to grid index, it is possible to use the grid index to derive on an initial sequence of the reference signal, or use a mapping relationship between the grid index and the reference signal sequence. In general, the result is, the reference signal sequences corresponding to different grid indexes are different. The reference signal sequences corresponding to the same grid index may be the same or different.

At block 306, the reference signal is transmitted in corresponding time-frequency resources according to the grid index and the reference signal port index.

In particular, when demodulation signal is transmitted in corresponding time-frequency resources based on the grid index and the reference signal port index, the reference signal sequences corresponding to different grid indexes may be transmitted in the same resources (the resources may include three dimension: time-domain, frequency-domain, code-domain, any one or any combination of the three dimensions may be considered when implementing the technical solution of the present application), the reference signal sequences corresponding to the same grid index may be transmitted using the same resources or different resources.

Now, the method of FIG. 3 is finished.

The above blocks 301 and 302 describe the grid division, indexing and assignment of grid index for the UE. With regard to the transmission method of the reference signal, merely the interaction between the base station and the user is cared about in the present application, i.e. the part beginning with block 303.

In accordance with the reference signal transmission method of FIG. 3, the present application also provides a reference signal receiving method as shown in FIG. 7. This method is applied to a UE side. It includes the following.

At block 701, PMI is reported or signal used by the base station to locate a UE is transmitted.

In particular, the base station may locate the UE via channel reciprocity through the report of the PMI or the transmission of the uplink reference signal, or the locating may be realized by GPRS or transmitting locating reference signal, etc., or by reporting position information by the UE. Whichever manner is adopted, it is merely required to provide certain position information to the network side by the UE.

This block is a general block about communication between the UE and the base station, but is not a necessary block of the method. Therefore, the omitting of this block does not affect the implementation of the present application.

At block 702, a grid index and a reference signal port index are received.

At block 703, a grid index and reference signal port index information of a paired user are received.

Block 703 is an optional block in the present method. That is, the base station may not transmit the grid index and the reference signal port index information of the paired user to the UE. If the base station transmits the grid index and the reference signal port information of the paired user to the UE, the information of blocks 702 and 703 may be transmitted via the same signaling.

At block 704, a reference signal is received based on the grid index and the reference signal port index, and an interference processing is performed when necessary.

After the UE acquires the grid index and the reference signal port information and other information, a corresponding reference signal may be generated and resources used by the reference signal may be determined. On one hand, the UE knows its grid index and the grid index of the paired user, and is able to determine the interference situation between the UE and the paired user according to a relationship between the grid indexes and the space position of the grids. If it is regarded that the interference is tolerable, no processing may be performed to the interference brought out by the reference signal of the paired user. If it is regarded that the interference is not tolerable, energy estimation may be performed to the reference signal based on the known reference signal information of the interfering user and then determine whether the interference is tolerable according to a result of the energy estimation. If tolerable, no further processing is performed to the interference. If not tolerable, interference elimination may be performed when estimating the reference signal based on the known reference signal information of the interfering user. Certainly, if the complexity of the interference elimination is acceptable, it is also possible to directly perform the elimination without the determination.

In particular, when determining whether the interference processing is required to be performed to the interference between the UE and the paired user according to the grid index of the UE and the grid index of the paired user and according to the relationship between the grid index and the grid space position, the following manner may be adopted: first, determine the space position of the present UE according to the grid index of the present UE and the relationship between the grid index and the grid space position, and determine the space position of the paired user according to the grid index of the paired user and the relationship between the grid index and the grid space position, if the spacing is smaller than a predefined distance, the interference processing is required; otherwise, the interference processing is not required.

In particular, when performing the energy estimation and interference elimination to the reference signal of the paired user, the following manner may be adopted: since the UE knows the grid index of the interfering user, the UE is able to obtain the reference signal sequence transmitted by the paired user based on the grid index of the paired user according to the reference signal sequence generating method. At the same time, since the UE knows the grid index of the paired user, the UE is able to determine the space channel direction of the paired user according to a relationship between the grid index and space position of the user, and further determine the pre-encoding vector of the paired user. Then, based on the channel estimation result without considering the interference elimination, the interference signal may be retrieved. After the interference signal is retrieved, the energy of the interference signal may be calculated and the interference signal may be eliminated. As such, the channel estimation result of the UE may be updated. In order to further improve the channel estimation performance, a multiple iterative manner may be adopted.

In particular, the number of pieces of paired user information notified by the base station may be larger than 1. The user may process one or more interferences according to a practical situation.

At block 705, data demodulation is performed according to the channel estimation result of the reference signal.

Now, the method of FIG. 7 is finished.

Based on the above grid division and indexing method, the existing scheduling method may be improved. In particular, during the scheduling, the grid index information may be used for simplifying the scheduling algorithm. In a traditional MU-MIMO scheduling, a complexity matrix calculation such as ZF algorithm is required to calculate Signal to Leakage and Noise Ratio (SLNR), so as to determine whether the users are fit for pairing. However, based on the relationship between the grid index and the space grid, it is possible to determine the interference situation between some users by merely the grid indexes. In case that the interference is low, the interference may be directly ignored during the calculation of equivalent SINR. Further, user pairing may be performed completely based on the grid indexes, without considering the pairing algorithm which requires matrix calculation. Thus, the complexity of the scheduling algorithm is decreased. FIG. 8 is a schematic diagram illustrating a scheduling method according to an embodiment of the present application. The method includes the following.

At block 801, a grid size is determined. As described above, the grid size may be determined according to at least one of the following factors: mobility speed, interference level, complexity, maximum number of users that can be supported, and network load, etc.

At block 802, the coverage area of the base station is divided into grids.

At block 803, grid indexes are assigned for the grids.

At block 804, a grid index of the UE is determined. Before this block, a Pre-encoding Matrix Indicator (PMI) or a signal used for locating the UE by the base station reported by the UE may be received, so as to determine the grid index of the UE.

At block 805, a candidate paired user is determined according to the grid index. As described above, for users in the same grid, it is regarded that the space isolation degree is relatively low. For users in different grids, the space isolation degree is relatively high. If the positions of two grids are rather far from each other, it may regard that users in these two grids do not interfere with each other. Therefore, in this block, it is possible to select a user with a space position farther than a predefined distance as the candidate paired user according to the grid index of the user and the relationship between the grid index and the space position of the grid.

At block 806, scheduling is performed within the scope of the candidate paired user.

In accordance with the above reference signal transmission method, the present application further provides a reference signal transmission apparatus. Its structure is as shown in FIG. 9, including: a notifying module, a reference signal generating module and a reference signal transmitting module; wherein the notifying module is adapted to notify a UE of a grid index and a reference signal port index of the UE; wherein a coverage area of a base station is divided into grids, the grid index of the UE is an index of a grid where the UE is located;

the reference signal generating module is adapted to generate a reference signal based on the grid index; and the reference signal transmitting module is adapted to transmit the reference signal in corresponding time-frequency resources based on the grid index and the reference signal port index.

In one embodiment, apparatus may further include a grid division module, adapted to divide the coverage area of the base station into the grids, each grid respectively corresponds to one grid index; schedule the UE according to the grid index and user information, assign the grid index and the reference signal port index to the UE; wherein UEs in the same grid are assigned with the same grid index and different reference signal port indexes, users in different grids are assigned with different grid indexes.

In one embodiment, the apparatus may further include a communication module, adapted to receive PMI or a signal used by the base station for positioning the UE reported by the UE before the notifying module notifies the UE of the grid index and the reference signal port index of the UE.

In one embodiment, the grid division module is further adapted to determine a grid size, divide the coverage area of the base station into the grids of the grid size, and assign grid indexes for the grids.

In one embodiment, the grid division module is further adapted to determine the grid size according to at least one of: mobility speed, interference level, complexity, maximum number of users supported, and network offload.

In one embodiment, the notifying module is further adapted to notify the UE of a grid index and a reference signal port index of at least one paired user.

In one embodiment, the notifying module is further adapted to select at least one paired user according to an interference level between the UE and other users.

In one embodiment, the reference signal generating module is further adapted to generate the reference signal corresponding to the grid index through deriving an initial sequence of the reference signal using the grid index or according to a mapping relationship between the grid index and a reference signal sequence.

In one embodiment, the reference signal transmitting module is further adapted to transmit reference signal sequences corresponding to different grid indexes using the same resources, and transmit reference signal sequences corresponding to the same grid index using the same or different resources.

In accordance with the reference signal receiving method of the present application, the present application further provides a reference signal receiving apparatus, as shown in FIG. 10. The apparatus includes: an index receiving module and a reference signal receiving module, wherein the index receiving module is adapted to receive a grid index and a reference signal port index of a UE, wherein a coverage area of a base station is divided into grids, the grid index of the UE is an index of a grid where the UE is located; and the reference signal receiving module is adapted to receive a reference signal based on the grid index and the reference signal port index.

In one embodiment, the index receiving module is further adapted to receive a grid index and a reference signal port index of at least one paired user.

In one embodiment, the apparatus as shown in FIG. 10 may further include an interference processing module, adapted to determine whether interference between the UE and the paired user requires interference processing according to a grid index of the UE and a grid index of the pair UE, and a relationship between the grid index and grid space position, if the interference processing is required, perform energy estimation to a reference signal of the paired user according to reference signal information of the paired user, if a result of the energy estimation indicates that the interference processing is required, eliminate the interference based on the reference signal information of the user when performing channel estimation according to the reference signal of the UE.

In one embodiment, the interference processing module is further adapted to determine a space position of the UE according to the grid index of the UE and the relationship between the grid index and the grid space position, determine a space channel direction of the paired user according to the grid index of the paired user and the relationship between the grid index and the grid space position, determine a pre-encoding vector of the paired user, retrieve an interference signal according to a channel estimation result without considering interference elimination, and calculating energy of the interference signal.

In accordance with the scheduling method of the present application, the present application further provides a scheduling apparatus, as shown in FIG. 11. The apparatus includes: an index determining module, a pairing module and a scheduling module; wherein the index determining module is adapted to determine a grid index of a UE, wherein a coverage area of a base station is divided into grids, the grid index of the UE is an index of a grid where the UE is located;

the pairing module is adapted to determine a candidate paired user based on the grid index; and the scheduling module is adapted to schedule the UE with a scope of the candidate paired user.

In one embodiment, the apparatus as shown in FIG. 11 may further include a grid division module, adapted to determine a grid size, divide the coverage area of the base station into the grids of the grid size, and assign grid indexes for the grids.

In one embodiment, the grid division module is further adapted to determine the grid size according to at least one of: mobility speed, interference level, complexity, maximum number of users supported, and network offload.

In one embodiment, the apparatus may further include a communication module, adapted to receive PMI or a signal used by the base station for positioning the UE reported by the UE.

In one embodiment, the pairing module is further adapted to select a user with a space position farther than a predefined distance as the candidate paired user according to the grid index of the user and the relationship between the grid index and the grid space position.

The foregoing descriptions are only preferred embodiments of this invention and are not for use in limiting the protection scope thereof. Any changes and modifications can be made by those skilled in the art without departing from the spirit of this invention and therefore should be covered within the protection scope as set by the appended claims.

The invention claimed is:

1. A base station (B S) in a wireless communication system, the BS comprising:
 a transceiver configured to:
  transmit, to a first terminal, a grid indicator and a first index of a first reference signal port for the first terminal, wherein the grid indicator indicates one of a plurality of grids, each of the plurality of grids corresponding to one of a plurality of regions defined by dividing a coverage area of the BS based on a grid size; and
  transmit, to a second terminal, the grid indicator and a second index of a second reference signal port for the second terminal; and
 at least one processor configured to:
  generate a first reference signal based on the grid indicator; and
  generate a second reference signal based on the grid indicator,
 wherein the transceiver is further configured to:
  transmit, to the first terminal, the first reference signal on a resource corresponding to the first reference signal port; and
  transmit, to the second terminal, the second reference signal on a resource corresponding to the second reference signal port,
  wherein the first terminal and the second terminal are assigned with the grid indicator in a same grid,
  wherein the transceiver is further configured to receive a pre-encoding matrix indicator (PMI) or a signal used by the BS for positioning the first terminal reported by the first terminal,
  wherein the at least one processor is further configured to:
   divide the coverage area of the BS into the plurality of grids, wherein each of the plurality of grids corresponds to each of the plurality of regions and each grid indicator;
   schedule the first terminal based on the plurality of grids and user information; and
   assign the grid indicator and the first index of the first reference signal port to the first terminal, and wherein terminals in a same grid are assigned with a same grid indicator and different indexes of reference signal port, and terminals in different grids are assigned with different grid indicators.

2. The BS of claim 1, wherein the at least one processor is further configured to:
determine the grid size;
divide the coverage area of the BS into the plurality of grids of the grid size; and
assign grid indicators for the plurality of grids,
wherein the grid size is determined based on at least one of a mobility speed, an interference level, a complexity, a maximum number of users supported by multi-user technology, or network offload.

3. A first terminal in a wireless communication system, the first terminal comprising:
at least one processor; and
a transceiver configured to:
receive, from a base station (BS), a grid indicator and a first index of a first reference signal port for a first terminal, wherein the grid indicator indicates one of a plurality of grids, each of the plurality of grids corresponding to one of a plurality of regions defined by dividing a coverage area of the BS based on a grid size;
receive, from the BS, the grid indicator and a second index of a second reference signal port for a second terminal;
receive, from the BS, a first reference signal that is generated based on the grid indicator on a resource corresponding to the first reference signal port; and
receive, from the BS, a second reference signal that is generated based on the grid indicator on the resource corresponding to the second reference signal port,
wherein the first terminal and the second terminal are assigned with the grid indicator in a same grid,
wherein the transceiver is further configured to receive a grid indicator of at least one paired terminal and an index of a reference signal port for the at least one paired terminal, and
wherein the at least one processor is configured to:
determine whether an interference between the first terminal and the at least one paired terminal requires interference processing based on the grid indicator of the first terminal and the grid indicator of the at least one paired terminal and a relationship between the grid indicator and a grid position;
if the interference processing is required, perform an energy estimation to a reference signal of the at least one paired terminal based on reference signal information of the at least one paired terminal; and
if a result of the energy estimation indicates that the interference processing is required, perform an interference elimination based on the reference signal information of the at least one paired terminal during a channel estimation by the reference signal for the first terminal.

4. The first terminal of claim 3, wherein the at least one processor is further configured to:
determine a position of the first terminal based on the grid indicator of the first terminal and a relationship between the grid indicator and a grid position;
determine a position of at least one paired terminal based on a grid indicator of the at least one paired terminal and the relationship between the grid indicator and the grid position;
determine a distance between the first terminal and the at least one paired terminal based on positions of the first terminal and the at least one paired terminal; and
if the distance is smaller than a predefined distance, perform interference processing.

5. The first terminal of claim 3, wherein the at least one processor is further configured to:
obtain a reference signal sequence transmitted by the at least one paired terminal based on the grid indicator of the at least one paired terminal;
determine a channel direction for the at least one paired terminal based on the relationship between the grid indicator and the grid position;
determine a pre-encoding vector of the at least one paired terminal;
retrieve an interference signal based on a channel estimation result; and
calculate an energy of the interference signal.

6. A method performed by a base station (BS) in a wireless communication system, the method comprising:
transmitting, to a first terminal, a grid indicator and a first index of a first reference signal port for the first terminal, wherein the grid indicator indicates one of a plurality of grids, each of the plurality of grids corresponding to one of a plurality of regions defined by dividing a coverage area of the BS based on a grid size;
transmitting, to a second terminal, a grid indicator and a second index of a second reference signal port for the second terminal;
generating a first reference signal based on the grid indicator;
generating a second reference signal based on the grid indicator;
transmitting, to the first terminal, the first reference signal on a resource corresponding to the first reference signal port;
transmitting, to the second terminal, the second reference signal on a resource corresponding to the second reference signal port;
determining the grid size;
receiving a pre-encoding matrix indicator (PMI) or a signal used by the BS for positioning the first terminal reported by the first terminal;
dividing the coverage area of the BS into the plurality of grids of the grid size; and
assigning grid indicators for the plurality of grids,
wherein the first terminal and the second terminal are assigned with the grid indicator in a same grid, and
wherein the grid size is determined based on at least one of a mobility speed, an interference level, a complexity, a maximum number of users supported by multi-user technology, or network offload.

7. The BS of claim 1, wherein the transceiver is further configured to transmit, to the first terminal, a grid indicator of at least one paired terminal and an index of a reference signal port of the at least one paired terminal, and
wherein the at least one processor is further configured to select the at least one paired terminal based on information regarding an interference between the first terminal and another terminal.

8. The BS of claim 1, wherein the at least one processor is further configured to:
derive an initial sequence of the first and second reference signals using the grid indicator; and generate the first and second reference signals corresponding to the grid indicator based on a mapping relationship between the grid indicator and a reference signal sequence.

9. The BS of claim 1, wherein the transceiver is further configured to:
transmit reference signal sequences corresponding to the different grid indicators using same resources; and
transmit reference signal sequences corresponding to the same grid indicator using same or different resources.

10. The method of claim 6, further comprising:
transmitting, to the first terminal, a grid indicator of at least one paired terminal and an index of a first reference signal port of the at least one paired terminal; and
selecting the at least one paired terminal based on information regarding an interference between the first terminal and another terminal.

11. The method of claim 6, further comprising:
deriving an initial sequence of the first and second reference signals using the grid indicator; and
generating the first and second reference signals corresponding to the grid indicator according to a mapping relationship between the grid indicator and a reference signal sequence.

12. The method of claim 6, further comprising:
transmitting reference signal sequences corresponding to different grid indicators using same resources; and
transmitting reference signal sequences corresponding to a same grid indicator using same or different resources.

13. The BS of claim 1, wherein the transceiver is further configured to transmit, to another terminal, a reference signal generated based on a grid indicator of the other terminal on the resource corresponding to the first reference signal port, and
wherein the grid indicator of the other terminal corresponds to another region in which the other terminal is located among the plurality of regions in the coverage area of the BS.

14. The first terminal of claim 3, wherein the resource corresponding to the first reference signal port is used by another terminal to receive a reference signal generated based on a grid indicator of the other terminal from the BS, and
wherein the grid indicator of the other terminal corresponds to another region in which the other terminal is located among the plurality of regions in the coverage area of the BS.

15. The method of claim 6, further comprising:
transmitting, to another terminal, a reference signal generated based on a grid indicator of the other terminal on the resource corresponding to the first reference signal port,
wherein the grid indicator of the other terminal corresponds to another region in which the other terminal is located among the plurality of regions in the coverage area of the BS.

16. The BS of claim 1, wherein the at least one processor is configured to assign the grid indicator and the first index of the first reference signal port to the first terminal based on the plurality of grids and the user information, and
wherein the user information comprises at least one of the PMI or the signal used by the BS for positioning the first terminal reported by the first terminal.

* * * * *